United States Patent [19]
Taylor

[11] Patent Number: 5,967,543
[45] Date of Patent: Oct. 19, 1999

[54] COMBINED GOLF BAG AND CART

[76] Inventor: John P. Taylor, 5761 Sonoma Mountain Rd., Santa Rosa, Calif. 95404

[21] Appl. No.: 08/841,771

[22] Filed: May 5, 1997

[51] Int. Cl.⁶ ....................................................... B62B 1/12
[52] U.S. Cl. ................ 280/645; 280/47.26; 280/DIG. 6; 206/315.4
[58] Field of Search ............................. 280/47.17, 47.18, 280/47.26, 63, 651, 79.2, 7.1, 645, DIG. 6; 220/212, 379; 206/315.6, 315.4

[56] References Cited

U.S. PATENT DOCUMENTS

| | | | | |
|---|---|---|---|---|
| 2,629,609 | 2/1953 | Wilson | ............................... | 280/DIG. 6 |
| 3,901,299 | 8/1975 | Picco | ..................................... | 280/315.4 |
| 3,985,373 | 10/1976 | Widegren | ........................... | 280/DIG. 6 |
| 4,012,051 | 3/1977 | Embinder | ............................... | 280/47.17 |
| 4,062,564 | 12/1977 | Schimmeyer | ...................... | 280/DIG. 6 |
| 4,767,001 | 8/1988 | Kim | ..................................... | 280/DIG. 6 |
| 4,792,152 | 12/1988 | Carolan | ............................... | 280/DIG. 6 |
| 5,074,576 | 12/1991 | Finley | ................................. | 280/DIG. 6 |
| 5,454,576 | 10/1995 | Pitkanen | ............................... | 280/47.26 |

FOREIGN PATENT DOCUMENTS

| | | | | |
|---|---|---|---|---|
| 2258405 | 2/1993 | United Kingdom | ................ | 280/47.26 |

*Primary Examiner*—J J Swann
*Assistant Examiner*—Frank Vanaman
*Attorney, Agent, or Firm*—Jack Lo

[57] ABSTRACT

A combined golf bag and cart includes a bag for housing golf clubs, and a collapsible wheel support structure attached to the bag. When the wheel support structure is extended, and a pair of wheels are attached thereto, the combined golf bag and cart is configured as a cart for being rolled around a golf course. The cart can be compacted and converted into a bag by detaching the wheels from the support structure, stacking them coaxially on a top opening of the bag, and collapsing the wheel support structure. When stacked, the lower wheel includes open opposite ends and spokes through which the clubs extend. The top wheel includes one open end through which the clubs extend, and a closed end that serves as a top closure, so that the clubs are completely enclosed by the bag and the wheels.

5 Claims, 2 Drawing Sheets

COMBINED GOLF BAG AND CART

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to golf carts and golf bags.

2. Prior Art

Golf clubs are typically carried and stored in golf bags. At a golf course, the golf bags are fastened onto golf carts for being transported around the greens. The separate golf bags and golf carts are cumbersome to transport and store.

Various combination golf bag and golf cart devices have been proposed for improved convenience. Such devices typically provide wheels attached to a collapsible support structure. U.S. Pat. No. 3,900,209 to McDonnell discloses a device with wheels that are removable and storable inside a hinged top cover. However, the wheels are stored with their axis orthogonal to the axis of the bag, so that the bag must be lengthened substantially to accommodate the wheels. U.S. Pat. No. 4,382,612 to Larkin discloses a device with removable wheels that are storable inside an exterior recess on the bottom of the bag. Although the wheels are stored coaxially with the bag, they still add some length thereto, because they are stored in a compartment separate from the club compartment. Further, the bag requires a separate top cover. U.S. Pat. No. 3,985,373 to Widegren discloses a device with spoked wheels that are storable coaxially inside the top opening of the bag. When the wheels are stored, the clubs extend between the spokes thereof. However, a separate top cover is still required.

OBJECTS OF THE INVENTION

Accordingly an object of the present invention is to provide a combined golf bag and cart that can be used for wheeling clubs around a golf course.

Another object of the present invention is to provide a combined golf bag and cart that can be compacted for convenient transportation and storage.

Another object of the present invention is to provide a combined golf bag and cart with removable wheels that are stackable coaxially with the bag for maximum compactness.

Yet another object of the present invention is to provide a combined golf bag and cart wherein the wheels also conveniently serve as a top cover for the bag.

Further objects of the present invention will become apparent from a consideration of the drawings and ensuing description.

BRIEF SUMMARY OF THE INVENTION

A combined golf bag and cart includes an elongated bag for receiving a plurality of golf clubs. A pair of wheels are removably attached to a wheel support structure, which is attached to the bag. The wheels may be detached from the support structure, and stacked coaxially on a top opening of the bag. One wheel includes open ends and a minimal number of spokes, so that the clubs extend therethrough. Another wheel includes one open end through which the clubs extend, and a closed end that serves as a top cover. The wheel support structure is collapsible for transportation and storage.

DRAWING REFERENCE NUMERALS

| | |
|---|---|
| 10. Bag | 11. Bottom Closure |
| 12. Open Top | 13. Wheel |
| 14. Wheel | 15. Wheel Support Structure |
| 16. Open End | 17. Open End |
| 18. Hub | 19. Spokes |
| 20. Tread | 21. Open End |
| 22. Closed End | 23. Center Closure |
| 24. Hub | 25. Golf Club |
| 26. Shoulder | 27. Shoulders |
| 28. Tread | 29. Strap |

DETAILED DESCRIPTION OF THE INVENTION

Figure 1:
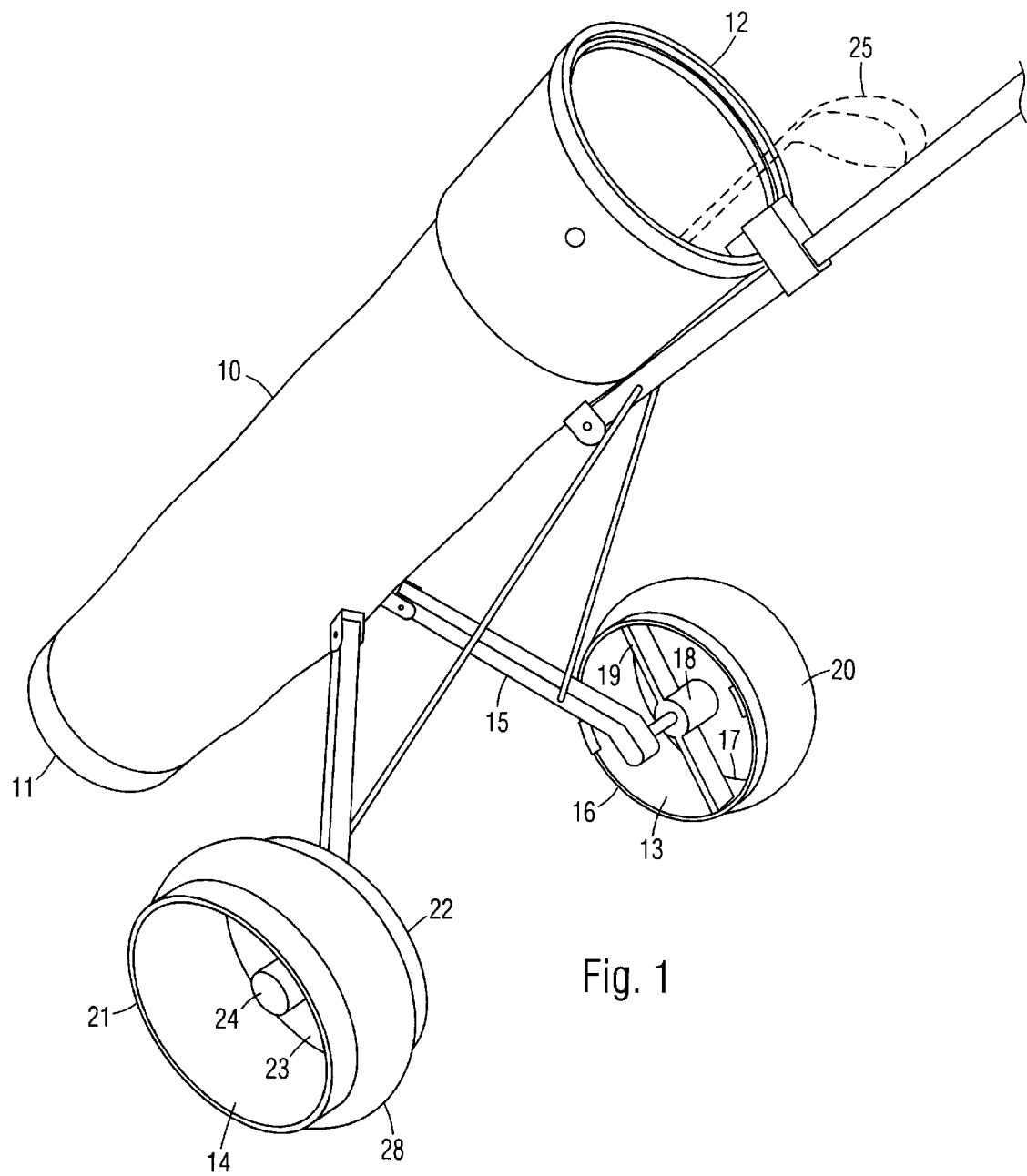
FIG. 1 is a side perspective view of a combined golf bag and cart in accordance with the invention.

FIG. 1:

In accordance with a preferred embodiment of the invention shown in the side perspective view of FIG. 1, a combined golf bag and cart includes a golf bag 10 with a bottom closure 11 and an open top 12. A pair of wheels 13 and 14 are removably attached to a wheel support structure 15. Wheel 13 includes open opposite ends 16 and 17, a hub 18 supported by spokes 19, and a tread 20. Wheel 14 includes a tread 28, an open end 21, and a closed end 22 with a center closure 23 supporting a hub 24. A golf club 25 extends through top opening 12. The present invention is thus configured as a golf cart for being wheeled around a golf course.

Figure 2:
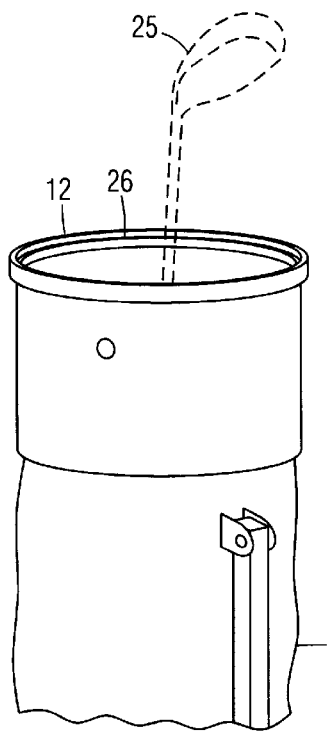
FIG. 2 is a side perspective view of the combined golf bag and cart when the wheel support structure is collapsed.
Figure 3:
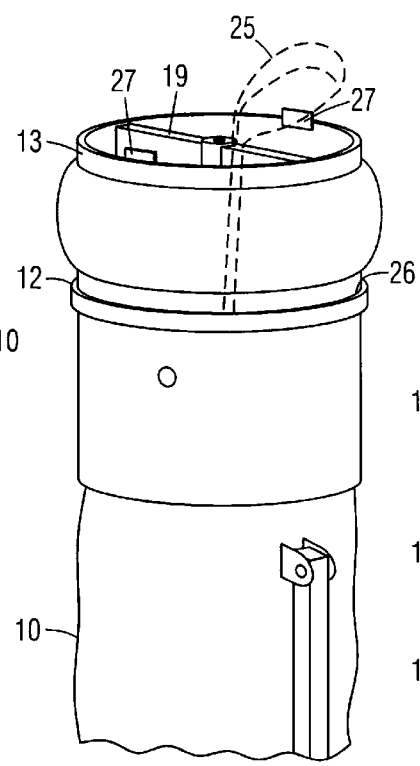
FIG. 3 is a side perspective view of the combined golf bag and cart when one wheel is stacked on the top opening.
Figure 4:
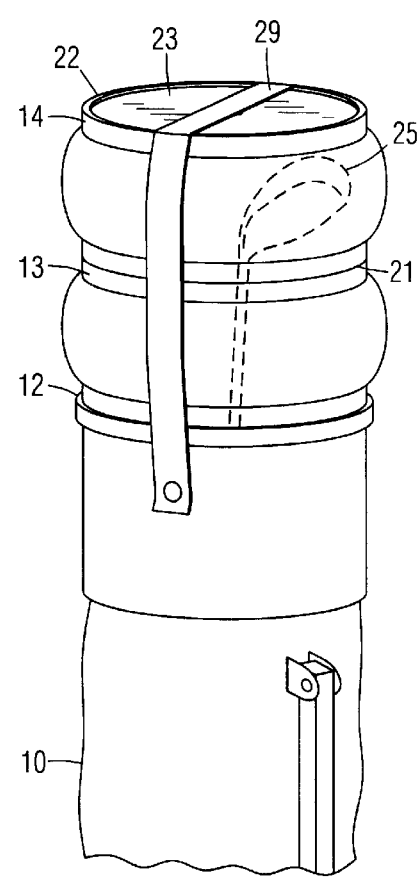
FIG. 4 is a side perspective view of the combined golf bag and cart when both wheels are stacked on the top opening.

FIGS. 2–4:

The combined golf bag and cart is collapsible for convenient transportation and storage. As shown in the side perspective view in FIG. 2, the wheels (not shown) have been removed from the wheel support structure, which is collapsed. Top opening 12 includes an aligning means or shoulder 26. As shown in FIG. 3, wheel 13 is coaxially positioned on opening 12 and aligned thereon by shoulder 26. Golf club 25 is positioned between spokes 19 and extended through both ends of wheel 13. Another aligning means or shoulders 27 are formed by a pair of tabs extending from the upper rim of wheel 13. As shown in FIG. 4, wheel 14 is positioned coaxially on top of wheel 13 and aligned therewith by shoulders 27 (FIG. 3). Wheels 13 and 14 are secured to opening 12 by a retaining means or strap 29. Club 25 is positioned through open end 21 of wheel 14, and closed end 22 provides top closure 23 for bag 10. The distance between top closure 23 and bottom closure 11 (FIG. 1) is preferably slightly greater than the length of the longest club being carried. The present invention is thus in a compacted condition, and is usable as a golf bag for being conveniently transported or stored.

SUMMARY AND SCOPE

Accordingly, I have provided a combined golf bag and cart that is usable for carrying and storing golf clubs. It is convertible into a golf cart for being wheeled around a golf course. It includes a collapsible wheel support structure which can be compacted for convenient transportation and storage. It includes removable wheels that are stacked coaxially on the bag for compactness, and the wheels are also used as a top cover for the bag.

Although the above descriptions are specific, they should not be considered as limitations on the scope of the invention, but only as examples of the embodiments. Many substitutes and variations are possible within the teachings of the invention. For example, wheel 13 may include fewer or more spokes. Shoulders 27 may extend around the entire circumference of wheel 13. Other aligning means may be used for aligning the wheels with each other and with the top of the bag. The top of the bag may be enlarged in diameter and lengthened to enclose the wheels. Wheel 14 may be attached directly to top opening 12, and wheel 13 may be attached elsewhere, such as to the bottom of the bag. Instead of a strap, other retaining means, such as latches, threaded shoulders, etc., may be provided for securing the wheels to each other and to the top of the bag. Other collapsible wheel support structures may be used, or a fixed wheel support structure may be used. The tubular collar below opening 12 may be eliminated. A stepped bottom may be provided in the bag, so that the longest clubs are supported on the lowest step, the medium clubs are supported on the intermediate step, and the shortest clubs are supported on the highest step. A recess may be provided on the side of bag 10 for enclosing the collapsed wheel support structure 15. Instead of being a cylinder with distinct ends, wheel 14 may simply comprise center closure 23, so that it is substantially a flat disc, and the tread may simply be the edge of the disc. Therefore, the scope of the invention should be determined by the appended claims and their legal equivalents, not by the examples given.

I claim:

1. A collapsible combined golf bag and cart, comprising:

an elongated bag for receiving a plurality of golf clubs, said bag having a longitudinal axis and a top opening;

a wheel support structure attached to said bag; and an open wheel and a closed wheel removably attached to said wheel support structure, said open wheel including open opposite ends, and said closed wheel including an open end and a closed end with a center closure, said open wheel and said closed wheel generally matching said top opening of said bag in diameter, so that when said combined golf bag and cart is collapsed, said open wheel is positioned on said top opening of said bag and coaxial therewith, said closed wheel is positioned on said open wheel and coaxial therewith, said open end of said closed wheel is positioned against said open wheel, said open wheel and said closed wheel cooperating with said bag to define an enclosure for said golf clubs.

2. The combined golf bag and cart of claim 1, wherein said wheel support structure is collapsible.

3. The combined golf bag and cart of claim 1, further including retaining means for securely retaining said open wheel and said closed wheel on said top opening of said bag.

4. The combined golf bag and cart of claim 1, further including a hub supported within said open wheel by a spoke, said spoke for enabling said golf clubs to extend through said open wheel.

5. The combined golf bag and cart of claim 1, further including aligning means for axially aligning said open wheel and said closed wheel with said top opening of said bag.

* * * * *